July 30, 1968  V. E. SMITH ETAL  3,394,942
HEAVY DUTY MOVING DOLLY
Filed Oct. 10, 1966  2 Sheets-Sheet 2
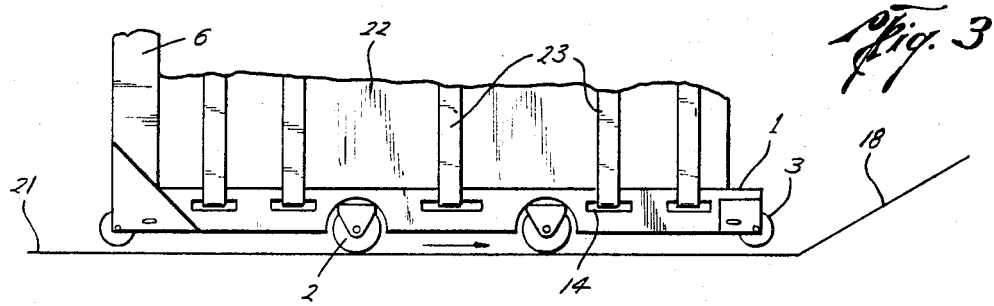
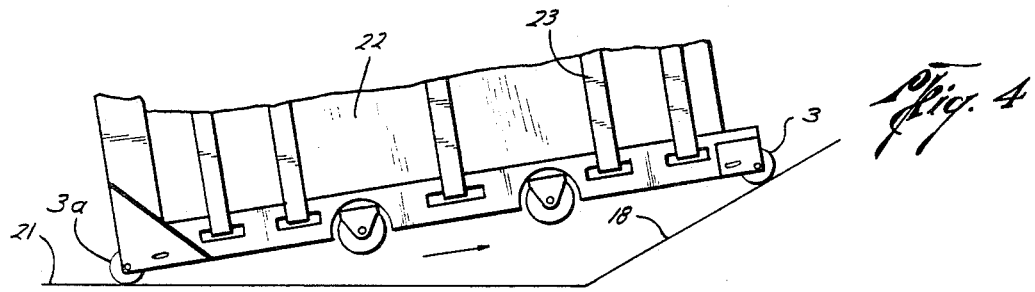
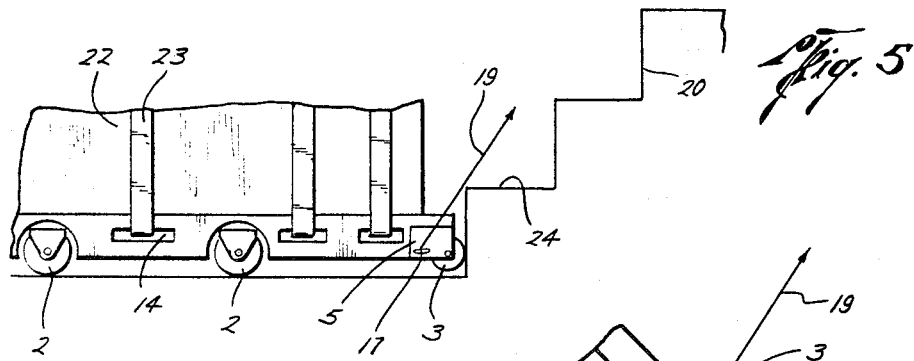
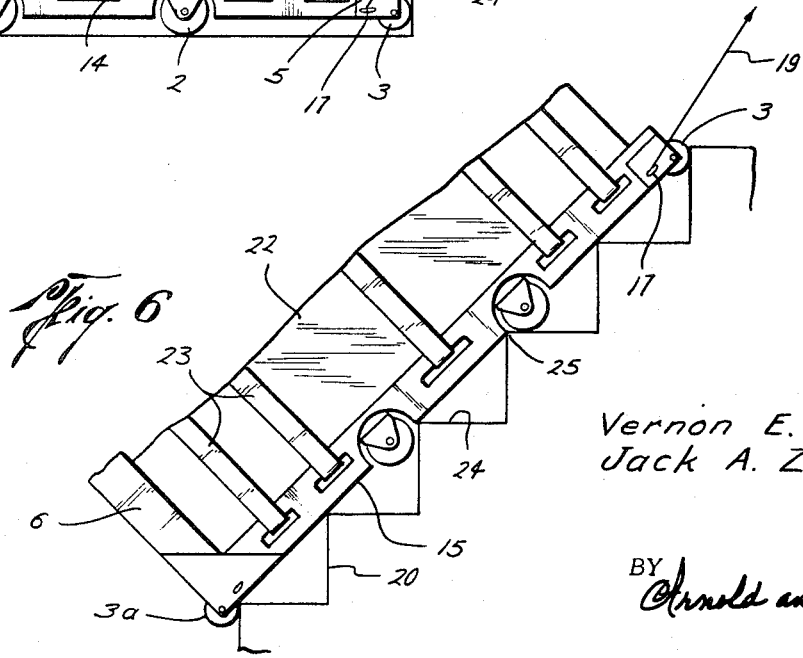
Vernon E. Smith
Jack A. Zachary
INVENTORS
ATTORNEYS

United States Patent Office 3,394,942
Patented July 30, 1968

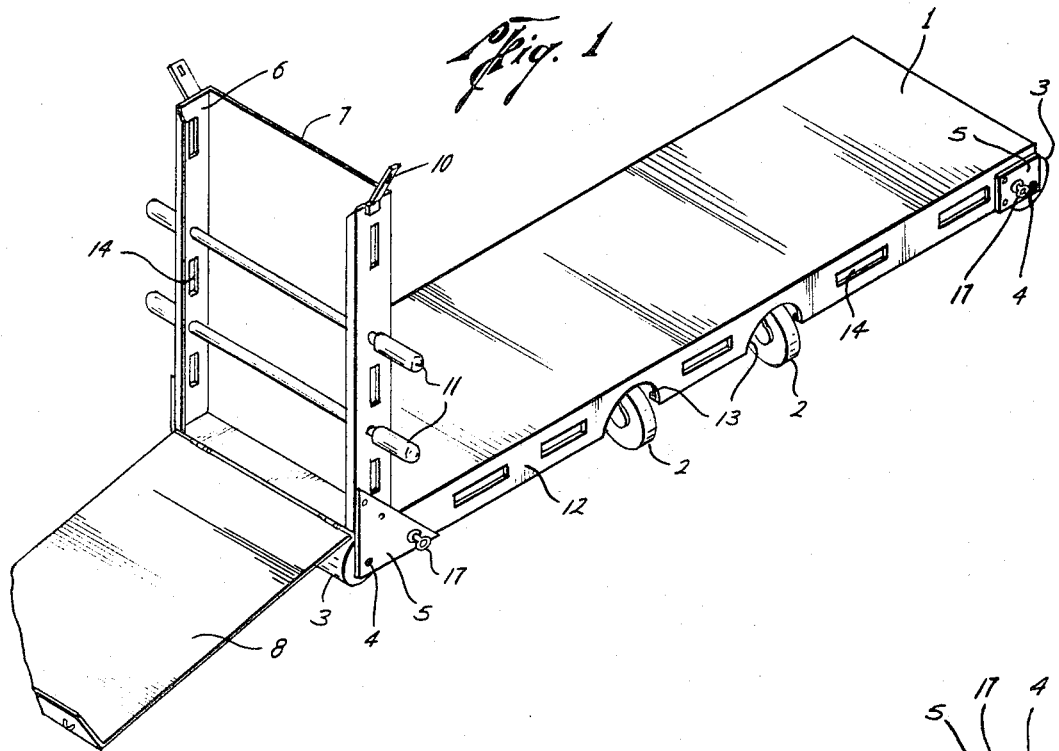
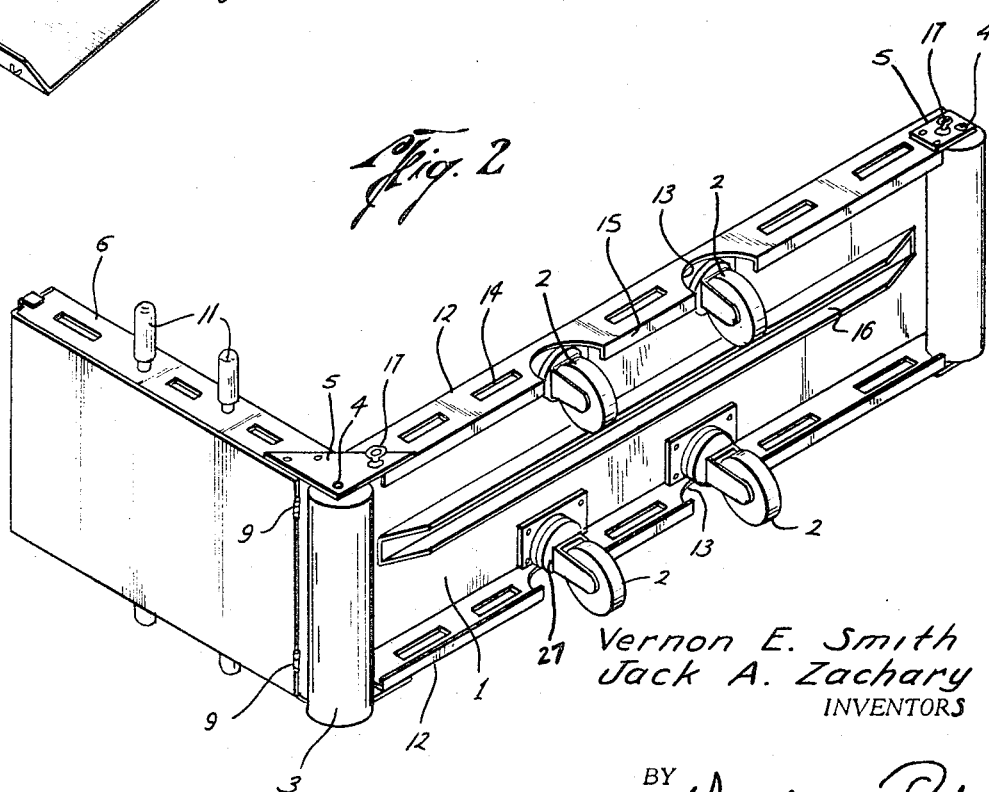

3,394,942
HEAVY DUTY MOVING DOLLY
Vernon E. Smith and Jack A. Zachary, Fort Worth, Tex., assignors, by direct and mesne assignments, of fifty percent to George V. Wimbish, thirty percent to T-M Industries, Inc., and twenty percent to Jack Alton Zachary
Filed Oct. 10, 1966, Ser. No. 585,532
6 Claims. (Cl. 280—5.24)

ABSTRACT OF THE DISCLOSURE

A heavy duty moving dolly which will not ground out under heavy loads and can be easily pulled up inclines or up a stairway while under load has an elongated body which is stably supported by a set of four swivel wheels centrally located with respect to the elongated dimension of the body. Transverse rollers extending entirely across the width of the body at either end provide the foremost and rearmost surfaces of the dolly and consequently can act as bumpers as well as rollers. The rollers are displaced upwardly from the plane on which the swivel wheels support the body. Also, supporting surfaces underneath the body of the dolly provide a supporting plane under the dolly which is lower than all the parts of the dolly save the swivel wheels and the rollers.

---

The instant invention relates to a novel vehicle useful for transport of heavy and bulky material. More particularly, the instant invention provides a novel hand-motivated platform vehicle useful in the movement of furniture and the like.

It has long been the custom in the moving industry to utilize small, swivel-wheeled dollies to transport heavy items of furniture or electrical appliances between the household and the moving van. However, because of the invertible stairways, inclines, and other irregular surfaces which must be negotiated in moving furniture in the dwelling, from the dwelling to the van, and in placing it on the van, there has been a continued primary reliance on manual handling of the furnishings. The loss of time, exposure to damage, and resultant expense engendered by the necessity to transport furnishings piece by piece between the dwelling and the van have been largely accepted by the moving industry as an intrinsic business liability and by the migrant as a preordained fate.

There has accordingly been provided by this invention a novel vehicle or dolly, which by new and unique placement of rolling wheels and rolling and sliding surfaces, enables heavy and bulky loads to readily be transported over irregular surfaces. Although the novel device of the instant invention provides advantages which will be immediately appreciated in the moving industry, it will also be appreciated that this novel vehicle will be useful in a multiplicity of applications where bulky and heavy loads must be moved.

It is accordingly an object of this invention to provide a novel transport vehicle or dolly which can negotiate irregular surfaces while fully loaded.

It is a further object of this invention to provide such a dolly which, when negotiating an irregular surface, consistently presents a rolling wheel or a rolling surface to obstacles in its path.

It is a still further object of this invention to provide such a novel compact dolly which can be readily moved by manual power.

It is another object of this invention to provide such a dolly equipped with means for securing the load thereon.

It is a further object of this invention to provide such a compact dolly which provides a place for storage in the dolly for securing straps, webs, or the like.

Although the instant novel device will be disclosed in the context of its application and utility as a hand-motivated vehicle, it will be appreciated that the novel and invertive concepts herein could be applied in a motor-driven device.

Thus, in accordance with this invention, there is provided a novel moving dolly comprising a load-bearing body, first roller means disposed to give stable support to said load-bearing body, and second roller means disposed across at least one extremity of said load-bearing body, the said second roller means being displaced upwardly from said first roller means and adapted not to engage a level surface over which said first roller means are rolling in a stable load-supporting relationship. The second roller means are displaced upwardly from the first roller means and are adapted to engage the surface being traversed and support the load-bearing member when the first roller means are not providing stable support, i.e., the dolly is tilted, or when the surface being traversed presents an upwardly-extending obstacle or incline.

The instant invention will be more particularly understood with reference to the specific embodiment illustrated in the accompanying drawings wherein:

FIGURE 1 is a perspective pictorial view showing a novel dolly in accordance with the instant invention, particularly illustrating the storage section provided integrally in the unit;

FIGURE 2 is a bottom pictorial view of a novel dolly in accordance with this invention;

FIGURE 3 is a schematic drawing showing the relative position of the rolling surfaces on the dolly when it is traversing a level surface in a stable fashion;

FIGURE 4 illustrates the operation of the dolly in ascending an incline;

FIGURE 5 shows the dolly approaching the first step of a staircase; and

FIGURE 6 shows the dolly being pulled up a staircase.

The drawings illustrate a dolly with a load-bearing body 1 stably supported by a set of wheels 2 and equipped with rollers 3 disposed transversely of the prime direction of movement of the dolly at opposite extremities of said platform. The rollers 3 do not engage a level surface over which wheels 2 are rolling, but are adapted to prevent the dolly from "grounding out" or becoming stuck with a heavy load upon encountering an incline or other irregularity in the surface being traversed. Rollers 3 are also the outermost projections on the dolly extending outwardly fore and aft of the body 1 such that these rollers are first to engage an obstacle, incline or steplike rise. Accordingly, the first surface presented to such an obstacle will in all cases be a rolling surface extending substantially across the width of the dolly. FIGURE 3 clearly shows the outward projection of rollers 3 from the body as well as the location of the rollers above the plane on which the dolly is supported by wheels 2.

Referring specifically to the drawings, the novel dolly of this invention has a load-bearing body supported from the underside by wheels 2. The load-bearing portion of body 1 is illustrated as a continuous, flat platform surface, though it will be appreciated that a suitable network of support members could be employed in place of the platform shown. Body 1 is braced on the underside for strength with suitable reinforcing members such as the strut illustrated at 16. Suitable padding may be provided the load-bearing surface of body 1 to provide protection for the articles transported.

The body 1 preferably is elongated along one dimension providing an elongated load-bearing area. The primary direction of movement of the dolly will generally correspond with the elongated dimension of the body, thus affording increased load capacity while maintaining the dolly of such size as readily pass through doorway openings and the like.

Body 1 is supported by four wheels affixed beneath body 1 and displaced apart by substantially the full width of the dolly, but located somewhat centrally with respect to the elongated dimension of the body 1 corresponding to the prime direction of movement of the dolly. The placement of wheels 2 is such that body 1 is stably supported by the wheels so imbalance of the dolly does not tend to occur upon the imposition of a substantially uniformly distributed load or upon application of ordinary lateral pushing force to move the dolly. The central location of the wheels 2 in the central portion of the dolly body may vary depending upon the overall size and the intended use of the vehicle. Generally, the wheels are displaced substantially centrally under the dolly displaced by a distance equal to about one-third the elongated dimension of the body. However, the principles of the instant invention may be employed in dollies wherein the wheels 2 are displaced under the body by a distance of from one-fifth to as much as two-thirds of the body length.

Four wheels 2 are illustrated in a rectangular or square placement arrangement. Such arrangement is preferred, though it will be appreciated that any arrangement of at least three disposed to give stable support to the body may be employed.

The wheels 2 are of the swivel type and are affixed to the underside of the body on suitable swivel mountings 27. Such swivel-mounted wheels are well known in the art. The swivel mounting of wheels 2 enable the dolly to be readily moved in any direction when all wheels are supporting the dolly in a stable position and resort is not had to rollers for support. Accordingly, the reference above to the prime direction of movement of the dolly refers to the direction corresponding to the elongated dimension of the body along which line the dolly will be most often moved. It is pointed out that rubber tires are suitably provided for wheels 2 to avoid damage to the polished floor surfaces encountered in private dwellings.

Each end of body 1 is equipped with rollers 3 disposed substantially across the entire width of the body transverse to the prime direction of movement of the dolly. The rollers 3 are preferably disposed such that they provide the foremost and rearmost transverse surfaces on the dolly, extending beyond the body 1 at both the front and rear of the dolly. Thus, this rolling surface is the first surface to engage a vertical obstacle or incline over which the dolly is to pass. The lower portion of the rolling surfaces of rollers 3 are displaced upwardly from the plane upon which the rolling surfaces of wheels 2 support the body such that the rollers 3 do not engage the ground when wheels 2 are rolling over a level surface in a stable load-supporting relationship.

Rollers 3 may be comprised of a single long cylinder mounted on an axle 4 suitably supported on brackets 5 from the body 1. In the alternative, rollers 3 may be comprised of a series of axially-aligned wheels similarly mounted on an axle and bracket. Preferably, rollers 3 are constructed from rubber or a like material thus better adapting the rollers 3 to grip and climb over an obstacle which they encounter and to stabilize the dolly as it starts on an incline. In addition, the use of such material for rollers 3 enables them to function as a bumper in the front and rear of the dolly against minimizing the prospect of damage from inadvertent collisions.

The rollers 3 and wheels 2 on the dolly together cooperate to greatly facilitate moving the dolly up an incline of virtually any steepness. For example, with reference to FIGURES 3 and 4, there is shown a novel dolly of this invention beginning the ascent of an incline 18. The dolly is shown bearing a load 22 which is secured to the dolly body 1 by webbing straps 23 fastened through webbing slots 14. As the foremost roller 3 (on the right as illustrated) engages the incline, the entire dolly body is raised lifting wheels 2 off the level surface 21 prior to the incline 18. However, as the foremost roller 3 ascends the incline, the aft roller 3a engages the level surface 18 thus preventing the dolly from "grounding out." Additionally, the fore roller 3 stabilizes the dolly by virtue of its tendency to maintain the direction straight up incline 18. If swivel wheels were the first to engage the incline, there would be a tendency for these wheels to turn permitting the front of the dolly to slide off laterally and down the incline if the force applied by the operator was not balanced.

Body 1 is preferably equipped with vertical side plates 12 extending downwardly from the load-bearing platform portion at the sides of the body. These side plates are suitably cut out at 13 to permit free swivel to wheels 2. In addition, the side plates 12 and vertical member 6 are equipped with webbing slots 14 to facilitate securing the load to the body platform. These webbing slots permit a strap to be secured around a load and to the body. Rather than the slots illustrated, loops or like means could be provided for securing straps or webbing around a load and on the body.

In addition to providing a location for webbing slots or like securing means, the downwardly-extending side plates on the body 1 also functionally contribute to the effectiveness of the dolly. The lower edges 15 of side plates 11 provide sliding surfaces which support the dolly and prevent its becoming stuck when traversing certain irregular surfaces. These lower sliding surfaces 15 on side plates 12 aid in preventing the dolly from "grounding out" as a result of an obstacle becoming wedged between the wheel and the underside of the platform such that the wheels 2 cannot overcome the obstacle.

Thus, the novel dolly of this invention can be readily pulled up a flight of stairs with a secured load as shown in FIGURES 5 and 6. FIGURE 5 shows a novel dolly in accordance with this invention abutting a first step 24 of a staircase. The dolly has a load 22 strapped to the body 1 with webbing straps 23. Rope 19 which also illustrates a force vector suitably applied to the dolly to pull it up the stairs is attached to eyelets 17 located on bracket 5 at the frontal sides of the body 1. As the dolly approaches the stair, fore roller 3 is first to engage first step 24. This provides a freely rolling surface engaging the vertical portion of step 24 such that the force applied by rope 19 will pull the front of the dolly over the first step. The front roller functions similarly upon reaching each subsequent step in the staircase. Aft roller 3a functions similarly on the stairway as on the incline illustrated in FIGURE 4 to prevent the dolly from "grounding out."

When the dolly is entirely on a stairway composed of steps 20 as illustrated in FIGURE 6, sliding surfaces 15 also function to support the dolly body on the stair such that the top portion 25 of each stair cannot wedge between the dolly body and the swivel mounting 27 of wheels 2. Inasmuch as sliding surfaces 15 preferably extend downwardly to the midpoint or slightly past the midpoint of wheels 2, the dolly is unlikely to become stuck in negotiating a stairway.

Although it is appreciated that the dolly of the instant invention must overcome each stair in negotiating a staircase, the rollers lend the dolly directional stability while the sliding surfaces 15 prevent wedging the wheels 2. Accordingly, the side plate portions provide sliding support surfaces such that the wheels 2 do not become wedged on an obstacle, and such that by combination of the wheels 2, rollers 3, and side plates 11, either a rolling surface or a sliding surface is presented to each obstacle the dolly traverses.

Thus, it is preferred that the side plates 11 extend downwardly from the platform portion of body 1 such that sliding surfaces 15 are below all other members on the dolly save the wheels 2 and rollers 3. Thus, sliding surfaces 15 should extend downward as far or further than body bracing members 16 affixed to the underside of the body for strength. It should be noted that the ends of the bracing members 16 are tapered upwardly to the body at each end 17 to minimize the possibility of their catching on an obstacle and becoming stuck. It is highly preferred that sliding surfaces 15 are located downwardly at least to the midpoint of wheels 2 such that the body is supported at a level which permits the wheels to move to readily overcome an obstacle.

Alternatively, a pipelike or similar downwardly-extending member providing a sliding surface on the underside can be affixed to body 1. The underside of the sliding member should be provided with a smooth sliding surface to facilitate pulling the dolly and to minimize the possibility of damage produced by the sliding action.

Body 1 is also provided with means permitting the ready securing of a rope thereto, such as eye loops 17. The location of these eye loops proximate the corners of the body enable the securing of ropes to the dolly to pull it in virtually any direction.

In the embodiment illustrated, one end of body 1 is equipped with a vertically-extending push member 6. The vertically-extending member is comprised of wall member 7 and door member 8 which together enclose a volume providing a convenient storage area within vertical member 6 for ropes, straps, webbing and the like. Door 8 is disposed on the outer side of vertical member 6 so that access may be had to the storage area when the dolly is loaded. Door 8 is shown hinged at 9 to the lower portion of vertical member 6; however, any suitable hinging arrangement may be employed. Latches 10 enable door 8 to be secured in a closed position when the dolly is in use.

Handles 11 are shown extending outwardly from the sides of vertical member 6. The handles are shown as bars or similar rigid members extending across the wall portion 7 of vertical member 6 and through each of the side walls thereof. Rubber or similar covering is preferably provided on the gripping portion of handles 10 to facilitate gripping thereof. Handles are provided on the vertical member at two different heights. The upper handles are located as to provide a convenient means for pushing the dolly while the lower handles are better located if the dolly is to be lifted.

Although in the illustrated embodiment, there is shown a dolly having a single vertical member at one end, the novel dollies of this invention can be provided with such push members on each end, or indeed, could be provided with a load bearing box constructed on the body.

The unique placement of rolling and sliding surfaces in the novel dolly of this invention enables it to be manually moved over other irregular surfaces with a minimum of difficulty. For example, if a small obstacle or irregularity is encountered by the wheels 2 such that it becomes difficult to push the dolly over the wheels, the dolly, if substantially uniformly loaded, can be tilted to the front or rear. This tilting action engages either the front or rear rollers 3 partially removing weight from the wheels 2 and enabling the operator to overcome the obstacle. The central location of the wheels makes it comparatively easy to tilt the dolly even with a relatively heavy load. Of course, the forward rollers also serve to enable the dolly to climb an incline or a large obstacle such as a step, serving also to stabilize the entire dolly as the roller 3 engages. In addition, as explained above, the sliding surfaces on the underside of side plates 11, in cooperation with the wheels and rollers enable to dolly to be pulled over steps, up stairs, and the like.

It will accordingly be appreciated that there is herein provided a dolly having the novel combination and placement of rolling surfaces, and the novel combination of rolling surfaces with sliding surfaces. Accordingly, it will be apparent to those skilled in the art that various modifications and structures can be provided in accordance with this invention without departing from the spirit or scope thereof.

What is claimed is:
1. A moving dolly comprising:
   (a) an elongated load bearing body;
   (b) a plurality of swivel wheels mounted on the body centrally with respect to said elongated dimension, and apart with respect to the width of said body, positioned to give stable support to said body;
   (c) roller means disposed entirely across the width of said body at each end thereof to provide the foremost and rearmost transverse surfaces on the body, the lower surface of said roller means being displaced upwardly from the plane on which said swivel wheels support the body; and
   (d) sliding support means disposed beneath said body extending downwardly to provide a supporting plane lower than all elements on said dolly other than said swivel wheels and said roller means.
2. The dolly of claim 1 wherein said sliding support means provide a support plane which extends downwardly to at least the midpoint of said swivel wheels.
3. The dolly of claim 1 wherein said elongated load bearing body is equipped with means to which straps may be secured to hold a load on said body.
4. The dolly of claim 1 including a member extending upwardly from one end of said body to facilitate pushing of the dolly.
5. The dolly of claim 4 wherein said upwardly extending member comprises a wall portion and a door portion defining a space suitable for storage.
6. The dolly of claim 1 wherein said second roller means comprises a cylindrical roller comprised of a rubberlike material.

References Cited

UNITED STATES PATENTS

| | | | |
|---|---|---|---|
| D. 169,337 | 4/1953 | Reece | 280—47.34 X |
| 1,341,013 | 5/1920 | Gadbois | 280—47.16 |
| 2,823,042 | 7/1955 | Gelbond | 280—5.24 |
| 2,955,836 | 10/1960 | Patricia | 280—47.34 |
| 3,266,813 | 8/1966 | Bosko et al. | 280—47.34 |
| 3,137,250 | 6/1964 | Hutchinson | 280—47.34 |
| 400,012 | 3/1889 | Shanks | 280—79.1 |

FOREIGN PATENTS 607,145   7/1960   Italy.

BENJAMIN HERSH, *Primary Examiner.*

J. SIEGEL, *Assistant Examiner.*